(12) United States Patent
Newberg et al.

(10) Patent No.: US 7,088,734 B2
(45) Date of Patent: Aug. 8, 2006

(54) SLOT FORMAT AND METHOD FOR INCREASING RANDOM ACCESS OPPORTUNITIES IN A WIRELESS COMMUNICATION SYSTEM

(75) Inventors: Donald G Newberg, Hoffman Estates, IL (US); Bradley M Hiben, Glen Ellyn, IL (US); Kevin G Doberstein, Elmhurst, IL (US)

(73) Assignee: Motorola, Inc., Schaumburg, IL (US)

( * ) Notice: Subject to any disclaimer, the term of this patent is extended or adjusted under 35 U.S.C. 154(b) by 824 days.

(21) Appl. No.: 09/818,814

(22) Filed: Mar. 27, 2001

(65) Prior Publication Data

US 2002/0141435 A1 Oct. 3, 2002

(51) Int. Cl.
*H04J 3/16* (2006.01)

(52) U.S. Cl. .................. 370/437; 370/329; 370/341

(58) Field of Classification Search ........ 370/335–337, 370/209, 280, 315, 330, 319–322, 331, 342, 370/348, 349, 324, 329, 345, 347, 436, 437, 370/442, 480, 498, 500, 501, 326, 341, 445, 370/447, 458, 461, 462, 465, 468; 455/447, 455/13.1, 452.2; 375/130, 147, 259, 260, 375/261; 709/227
See application file for complete search history.

(56) References Cited

U.S. PATENT DOCUMENTS

| | | | | |
|---|---|---|---|---|
| 4,942,570 A * | 7/1990 | Kotzin et al. | .............. | 370/263 |
| 5,012,469 A * | 4/1991 | Sardana | .............. | 370/322 |
| 5,025,442 A * | 6/1991 | Lynk et al. | .............. | 370/280 |
| 5,278,833 A * | 1/1994 | Crisler et al. | .............. | 370/348 |
| 5,343,499 A * | 8/1994 | Jasper et al. | .............. | 375/261 |
| 5,357,513 A * | 10/1994 | Kay et al. | .............. | 370/332 |
| 5,519,730 A * | 5/1996 | Jasper et al. | .............. | 375/260 |
| 5,577,024 A * | 11/1996 | Malkamaki et al. | .............. | 370/335 |
| 5,636,223 A * | 6/1997 | Reardon et al. | .............. | 370/431 |
| 5,752,193 A * | 5/1998 | Scholefield et al. | .............. | 455/452.2 |
| 5,793,757 A * | 8/1998 | Uddenfeldt | .............. | 370/335 |
| 5,822,359 A * | 10/1998 | Bruckert et al. | .............. | 375/145 |
| 5,946,624 A * | 8/1999 | Petranovich et al. | .............. | 455/447 |
| 5,956,325 A * | 9/1999 | Citta et al. | .............. | 370/252 |
| 5,960,000 A * | 9/1999 | Ruszczyk et al. | .............. | 370/447 |
| 5,963,557 A * | 10/1999 | Eng | .............. | 370/432 |
| 6,075,779 A * | 6/2000 | Agarwal et al. | .............. | 370/337 |
| 6,078,959 A * | 6/2000 | Wright et al. | .............. | 709/227 |
| 6,122,323 A * | 9/2000 | Johnson | .............. | 375/259 |
| 6,144,653 A * | 11/2000 | Persson et al. | .............. | 370/337 |
| 6,172,971 B1 * | 1/2001 | Kim | .............. | 370/348 |
| 6,195,327 B1 * | 2/2001 | Lysejko et al. | .............. | 370/201 |
| 6,252,910 B1 * | 6/2001 | West et al. | .............. | 375/261 |
| 6,370,153 B1 * | 4/2002 | Eng | .............. | 370/438 |
| 6,381,211 B1 * | 4/2002 | Lysejko et al. | .............. | 370/209 |
| 6,507,587 B1 * | 1/2003 | Bahl | .............. | 370/443 |
| 6,529,520 B1 * | 3/2003 | Lee et al. | .............. | 370/442 |
| 6,560,209 B1 * | 5/2003 | Alamouti et al. | .............. | 370/330 |
| 6,560,210 B1 * | 5/2003 | Matusevich | .............. | 370/331 |

(Continued)

Primary Examiner—Phirin Sam
(74) Attorney, Agent, or Firm—Steven R. Santema; Indira Saladi

(57) ABSTRACT

A communication system and method for communicating information in one or more time slots a predetermined bandwidth is disclosed. The system and method comprise communicating information, by at least one communication unit, in selected one or more random access subslots. The one or more times slots are divided into multiple subchannels, wherein each subchannel of the multiple subchannels is non-overlapping in frequency and divided into the one or more random access subslots that is non-overlapping in time.

20 Claims, 9 Drawing Sheets

U.S. PATENT DOCUMENTS

| | | | |
|---|---|---|---|
| 6,567,396 B1 * | 5/2003 | Pohjanvouri et al. | 370/349 |
| 6,567,416 B1 * | 5/2003 | Chuah | 370/418 |
| 6,600,776 B1 * | 7/2003 | Alamouti et al. | 375/147 |
| 6,621,851 B1 * | 9/2003 | Agee et al. | 375/130 |
| 6,690,657 B1 * | 2/2004 | Lau et al. | 370/315 |
| 6,731,615 B1 * | 5/2004 | Bousquet et al. | 370/321 |
| 2002/0098802 A1 * | 7/2002 | Karabinis | 455/13.1 |
| 2002/0118661 A1 * | 8/2002 | Voce | 370/337 |

* cited by examiner

SLOT FORMAT AND METHOD FOR INCREASING RANDOM ACCESS OPPORTUNITIES IN A WIRELESS COMMUNICATION SYSTEM

FIELD OF THE INVENTION

This invention relates generally to communication systems, and more particularly to the time slot structure used in time division multiple access communication systems.

BACKGROUND OF THE INVENTION

Communication systems, such as land mobile radio and cellular communications systems, are well known. Such systems typically include a plurality of radio communication units (e.g., vehicle-mounted mobiles or portable radios in a land mobile system and radio/telephones in a cellular system), one or more repeaters (usually located at a fixed repeater site) and other equipment used in the processing and monitoring of communications. The repeaters are typically connected to other fixed portions of the system (i.e., the infrastructure) via wire connections, whereas the repeaters communicate with communication units and/or other repeaters within the coverage area of their respective sites via wireless link(s).

As is well known, such communication systems often employ a combination of frequency division duplexing (FDD) and time division multiple access (TDMA). In FDD, different frequencies are used for communication from the repeaters to the communication units (called the downlink) and from the communication units to the repeaters (called the uplink). In TDMA, the uplink and downlink frequencies are divided into blocks of time called time slots. Generally, in most TDMA systems, the time slots are of fixed length. On the downlink, the repeaters transmit continuously with different time slots destined for different communication units. On the uplink, the communication units take turns transmitting in different time slots.

Generally, in most TDMA systems, the majority of slots on the uplink are assigned to the different communication units by the repeater. This is done so that two or more communication units do not transmit at the same time. The remaining uplink slots are designated as random access slots by the repeater. During random access slots any of the communication units may transmit. Because the random access slots are not assigned to a particular communication unit, multiple communication units may transmit at the same time resulting in a collision and causing the repeater not to receive either transmission. One of the uses for the random access slots is for the communication units to request assignment of uplink slots. In such case, the request for slot assignments usually requires only a small amount of data to be transferred. Using a full slot for assignment request will therefore result in wasted bandwidth. Because of this some existing TDMA systems divide the random access slots in time to form multiple subslots from each random access time slots. A communication unit requesting uplink slot assignment transmits the request in only one of the subslots. This increases the number of opportunities for communication units to send request and thereby reduces the chance of collisions with transmissions from other communication units.

There is shown in FIG. 1 an example of a TDMA uplink slot 100 that has been divided into two subslots 102, 104 for use as a random access slot. Each of the subslots 102, 104 comprises a synchronization section 110, a data section 112, and a guard band 116. The synchronization section 110 is used by the repeater receiving the transmission to time synchronize with the transmitting communication unit. The data section 112 contains the information for requesting assignment of the downlink slot or other data. The guard band 116 is necessary to account for the propagation time between the communication unit transmitting a subslot and the repeater. The guard band 116 is used to keep the transmissions of communication units in adjacent subslots 102, 104 from overlapping.

Wireless links with wider bandwidths are being used in today's TDMA communication systems. Because of the wider signal bandwidths, these communication systems are able to send more information per unit of time than the smaller bandwidth signals used in previous communication systems. This allows the data section 112 of the TDMA subslots to be shortened since it takes less time to send the same amount of information. However, the guard band 116 can not be shortened since it is dependent on the propagation time between the communication units and the repeater and is therefore not effected by the signal bandwidth. The synchronization section can also not be significantly shortened beyond a certain point without negatively effecting time synchronization performance. Hence, as the signal bandwidth is increased, there is a limit to how short the subslots can be made in time. Since wider bandwidth TDMA communication systems often have shorter length time slots than smaller bandwidth TDMA communication systems, having increased signal bandwidth can actually result in having fewer subslots in TDMA random access time slots. It would therefore be desirable to find another method for dividing a TDMA time slot into subslots so as to increase the number of subslots.

As mentioned previously, if more than one communication unit attempts to transmit in a random access subslot at the same time, a collision will result and the repeater may not receive either transmission. In such case, the communication units may retransmit in a future random access time slot. Commonly, when doing such retransmissions each communication unit waits a random length of time before retransmission so that their retransmissions do not collide a second time.

In communication systems with wider bandwidth signals, each of the random access time slots will be able to contain a larger number of subslots. Because of this, the number of TDMA time slots allocated for random access is likely to be reduced. Hence, the amount of time that the communication unit is required to wait after a collision to do retransmissions is increased resulting in a longer delay to obtain permission to transmit on uplink reserved slots. It would be desirable to find a method to decrease the number of collisions that occur in random access slots so as to reduce the frequency of these delays.

Therefore there is a need for a new method of dividing a random access time slot into subslots in wider bandwidth TDMA systems. Advantageously, the method should more efficiently use the TDMA time slot than simply dividing the time slot in time into subslots. Additionally, there is a need for a method of transmitting in random access subslots that reduces the need for doing retransmissions in future random access time slots. This invention is directed to addressing these needs.

BRIEF DESCRIPTION OF THE DRAWINGS

The foregoing and other advantages of the invention will become apparent upon reading the following detailed description and upon reference to the drawings in which.

DESCRIPTION OF A PREFERRED EMBODIMENT

Figure 2:
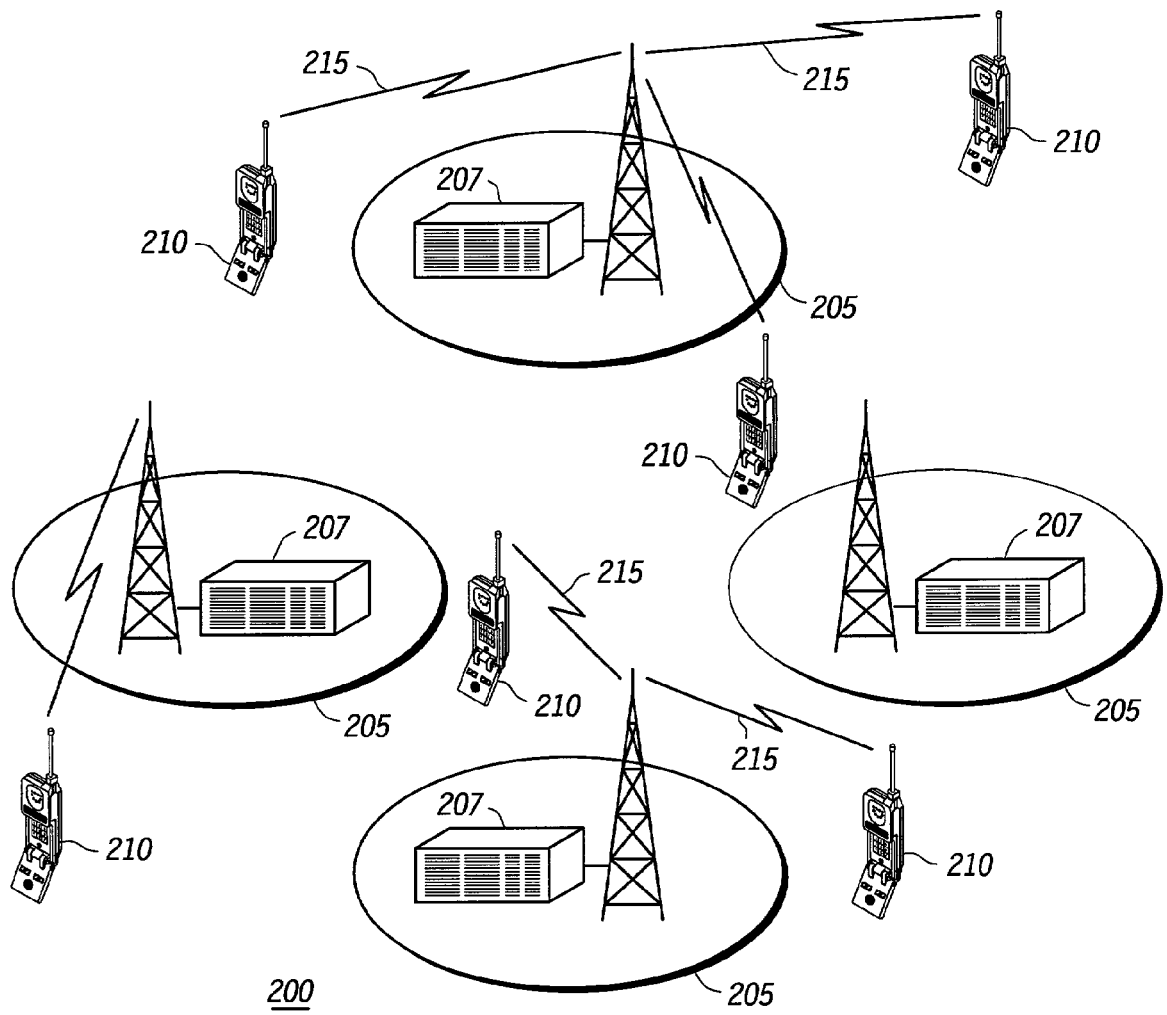
FIG. 2 shows a communication system according to one embodiment of the present invention.

Turning now to the drawings and referring initially to FIG. 2, there is shown a communication system 200 according to one embodiment of the present invention. The communication system 200 comprises a plurality of communication units 210 and repeater sites 205. Each repeater site 205 includes one or more repeaters 207 that provide communication service to the communication units 210 within the coverage area of the repeater site 205 over wireless links 215. Each wireless link 215 can be shared by multiple communication units 210. The repeater sites 205 are connected to each other by a communication system infrastructure (not shown) such as, for example, tat is described in US application Serial No. 20020093948 tided "Packet-Based Multimedia Communication System Having One or More Wireless Links", assigned to the assignee of the current invention and incorporated herein by reference in its entirety.

In one embodiment, the communication units 210 comprise wireless radio terminals that are equipped for 2-way communication of IP datagrams (or packets) associated with multimedia calls (e.g., voice, data or video, including but not limited to high-speed streaming voice and video) and data transfers singly or simultaneously with other communication units 210 or devices in the communication system 200. In such case, the communication units 210 include the necessary call control, voice and video coding, and user interface needed to make and receive multimedia calls. As will be appreciated, however, the communication units 210 may comprise virtually any mobile or portable wireless radio units, cellular radio/telephones, devices having varying capacities to accommodate multimedia calls, portable computers with wireless modems, or any other wireless device with the need for communication over wireless links. For example, it is envisioned that some communication units 210 may be able to transceive voice and data, not video; other communication units 210 may be able to receive but not transmit video; while still other communication units 210 may be able to transceive only data, and so forth.

Figure 3:
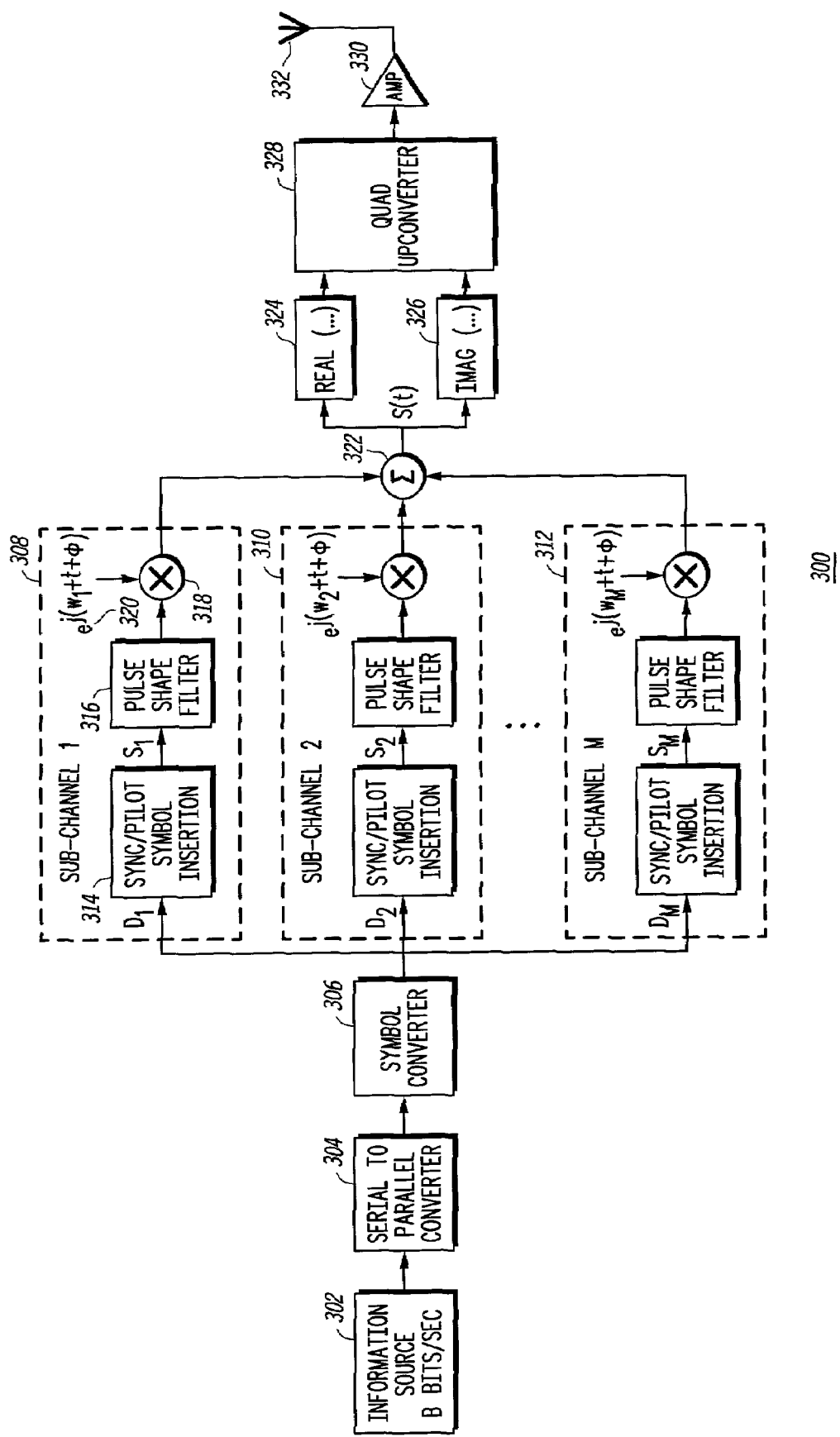
FIG. 3 is a block diagram of a multiple subchannel QAM transmitter according to one embodiment of the present invention.

In one embodiment of the present invention, the communication units 210 and repeaters 207 include multiple subchannel transmitters and receivers for communication over the wireless links 215. There is shown in FIG. 3 a block diagram of one such multiple subchannel transmitter 300. The transmitter 300 performs the function of transmitting a stream of binary data over a radio channel. In one embodiment, the binary data is split among M subchannels with each subchannel using 16-QAM modulation. Alternatively, the subchannels may use different types of modulation such as, for example, QPSK or 64-QAM, or some combination thereof. In one embodiment many of the functions of the transmitter 300 are performed by a digital signal processor (hereinafter "DSP") such as one of the DSP 56000 family of processors, commercially available from Motorola, Inc. As is well known in the art, a DSP is a type of microprocessor that has been optimized to perform mathematical operations at very high speeds.

The transmitter 300 receives information from an information source 302. In the embodiment of FIG. 3, the information to be transmitted comprises a stream of bits. This stream of bits can represent data from a computer, digitized voice, digitized video, or any other signal that can be represented by a stream of binary digits. The bit stream from the information source is sent into a serial to parallel converter 304 where it is split into M different streams. Each of the M different bit streams is then sent into a symbol converter 306 that transforms the bit streams into symbol streams appropriate for the selected modulation type. Thus, for example, where 16-QAM modulation is used, the symbol converter 306 transforms each of the M different streams of bits into a stream of 16-QAM symbols. Alternatively, it will be appreciated that the serial to parallel converter 304 and symbol converter 306 may be interchanged so that the stream of bits is first transformed to QAM symbols and then the resulting stream of QAM symbols is split into M different streams.

The M streams of complex symbols are then sent from the symbol converter 306 to the M subchannel processing blocks 308, 310, 312. For convenience, the processing block 308 for only the first subchannel will be described in detail herein, inasmuch as the processing blocks for the other subchannels 310, 312 operate in substantially similar fashion as the first processing block 308. To that end, turning to the first processing block 308, a data symbol stream $D_1$ is provided from the symbol converter 306 to the sync/pilot symbol insertion element 314. This element inserts synchronization ("sync") symbols and pilot symbols into the data symbol stream, $D_1$, yielding a composite symbol stream $S_1$.

The composite stream $S_1$ is then sent to the pulse shape filter block 316, which shapes each pilot, sync, and data symbol for transmission. The purpose of the shaping is to bandlimit the spectrum of each subchannel so that it does not overlap other subchannels or signals.

Figure 4:
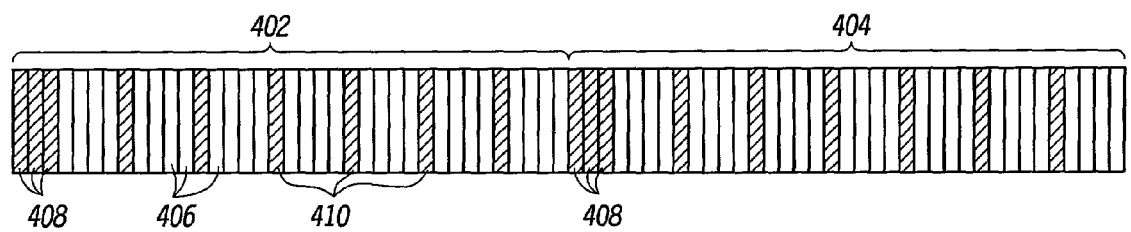
FIG. 4 shows an example of a symbol stream for two TDMA slots after insertion of synchronization and pilot symbols.

FIG. 4 shows an example of a composite symbol stream after the insertion of sync and pilot symbols for two time slots 402, 404 of a time division multiplex access (TDMA) system. The symbol stream for one time slot is comprised mostly of data symbols 406 that are obtained by mapping binary data to 16-QAM symbols. Sync symbols 408 are positioned at the beginning of the slot to allow the receiver to determine the best position to perform symbol sampling. The symbol stream also contains pilot symbols 410 inserted at selected intervals. The pilot symbols 410 are used by the receiver to determine the phase of the carrier and to estimate the effects of various channel impairments (e.g., noise, distortion) on the signal as it travels from transmitter to receiver. The receiver knows the characteristics of the pilot and sync symbols that will be transmitted as well as their position in the TDM time slot. This can be achieved by either using the same pilot and sync symbols for every time slot or by using the same algorithm in both the transmitter and receiver to calculate the sync and pilot symbols. It should be noted that the pilot and sync symbols do not have to come from the same symbol constellation (i.e. 16-QAM, QPSK, 64-QAM, etc.) as the data symbols. When the receiver receives the signal, a comparison can be made between the pilot symbols received and the pilot symbols transmitted to allow the receiver to estimate the effects of the communication channel impairments. The received symbol stream can then be adjusted to compensate for phase and amplitude errors of the received data symbols.

Returning again to the subchannel processing block 308 of FIG. 3, after passing through the pulse shape filter 316, each subchannel stream must be frequency translated to a separate sub-carrier frequency. In one embodiment, this frequency translation is accomplished by a complex mixer 318, which modulates the subchannel symbol stream by a sub-carrier signal 320. Preferably, each sub-carrier is at a different frequency so that the subchannels do not overlap in frequency.

After the subchannel symbol streams have been shifted up to their sub-carrier frequencies, these subchannel outputs are combined by a summation block 322 to form a composite signal, S(t). The real and imaginary parts of the composite signal S(t) are separated by blocks 324, 326 and then provided to a quadrature upconverter 328. As is well known in the art, the quadrature upconverter mixes the real and imaginary parts of the composite signal S(t) up to radio frequency. The upconverted signal is supplied to an amplifier 330 and then applied to an antenna 332 for transmission.

In one embodiment of the invention, the operations of the pulse shape filter 316, subchannel mixer 318, and summation block 322 are performed in a DSP using a fast Fourier transform (FFT) filter bank. The use of such a filter bank to implement a multiple subchannel modulator is illustrated in "Multirate Digital Signal Processing" by Ronald E. Crochiere and Lawrence R. Rabiner, pp. 297–324, published by Prentice-Hall, Inc., incorporated herein by reference.

Figure 5:
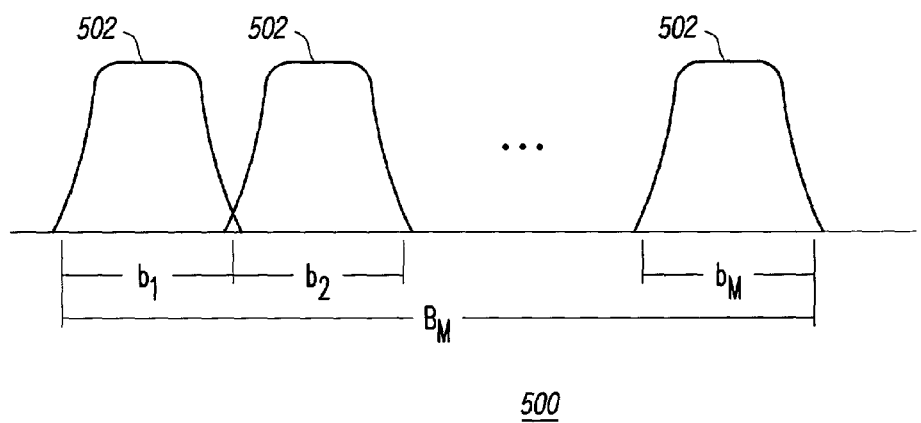
FIG. 5 shows an example of a frequency spectrum for an M subchannel QAM system.

FIG. 5 shows one example of the frequency spectrum of the composite signal S(t) for an M subchannel system. The composite signal S(t) is made up of M subchannels 502 spanning respective subchannel bandwidths $b_1, b_2, \ldots, b_M$, and the entire M subchannels approximately span a bandwidth $B_M$. Generally, the number of subchannels M may comprise an arbitrary number of subchannels. The spacing of the subchannels 502 is chosen to be far enough apart such that the subchannels 502 do not significantly overlap yet are close enough together that the total bandwidth of the signal does not exceed the available bandwidth.

The bandwidth $B_M$ of the composite signal is also somewhat arbitrary but may be dictated by a regulatory authority, such as the Federal Communication Commission ("FCC") in the United States. For example, in the 746–806 MHz band, the FCC recommends a channelization strategy that would permit three channel types: 50 kHz, 100 kHz or 150 kHz. According to one embodiment of the present invention, the bandwidth $B_M$ comprises 50 kHz, 100 kHz or 150 kHz, and the number of subchannels M comprises 8, 16, or 24 respectively, corresponding to those three channel types. In one embodiment, each subchannel spans a bandwidth of 5.4 kHz. This results in an occupied signal bandwidth of 44 kHz, 87 kHz, and 130 kHz for the 8, 16, and 24 subchannel embodiments, fitting into the respective 50 kHz, 100 kHz, and 150 kHz channel types. It will be appreciated, however, that the bandwidth $B_M$, the number of subchannels and/or the subchannel bandwidths may be tailored to suit different communication system parameters or different regulatory requirements.

Figure 6:
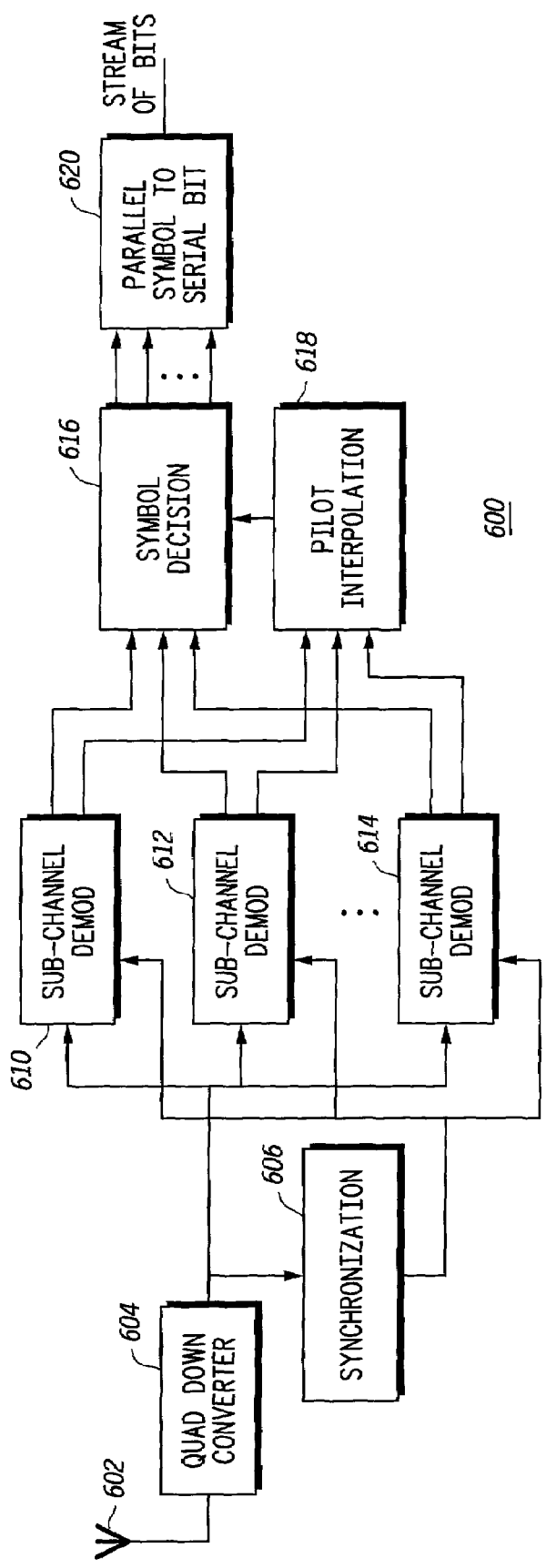
FIG. 6 shows a block diagram of a multiple subchannel QAM receiver according to one embodiment of the present invention.

There is shown in FIG. 6 a receiver 600 that may be used in conjunction with the transmitter 300 (FIG. 3). The receiver 600 includes an antenna 602 for receiving the M subchannel QAM signal from the transmitter after it has been subject to corruption by the communications channel. These corruptions can include frequency selective, Rayleigh, and Rician fading, the addition of noise, or a Doppler shift. The signal is then sent to a quadrature downconverter 604 that translates the received signal down from the radio frequency so that it is centered substantially at 0 Hz. The downconverted signal is then sent into M subchannel demodulator blocks 610, 612, 614 and a synchronization block 606.

The synchronization block 606 uses the sync symbols of the TDM time slot to determine when the time slot begins and when to sample each data, sync, and pilot symbol so that samples are obtained in the center of the symbol pulse shape. Synchronization subsystems are well known in the art. One example of a synchronization subsystem for a 4 subchannel QAM signal can be found in U.S. Pat. No. 5,343,499 titled "Quadrature Amplitude Modulation Synchronization Method" (hereinafter "the '499 patent") assigned to the assignee of the present invention and incorporated herein by reference in its entirety. It will be appreciated that a synchronization subsystem for an M subchannel QAM system can be easily generalized from the 4 subchannel QAM system taught in the '499 patent. The timing information obtained by the synchronization block 606 is sent to the M subchannel demodulators 610, 612, 614.

The M subchannel demodulators 610, 612, 614 receive as inputs the M subchannel signal from the quadrature downconverter 604 and the timing information from the synchronization subsystem 606. The subchannel demodulator outputs corrupted raw data, pilot, and sync symbols. These corrupted symbols differ from the symbols that were sent by the transmitter 300 (FIG. 3) because of the effects of the communication channel. The corrupted data symbols are sent from the subchannel demodulation block 610, 612, 614 to a symbol decision block 616 and the corrupted pilot and sync symbols are sent from the subchannel demodulator 610, 612, 614 to a pilot interpolation block 618.

Figure 7:
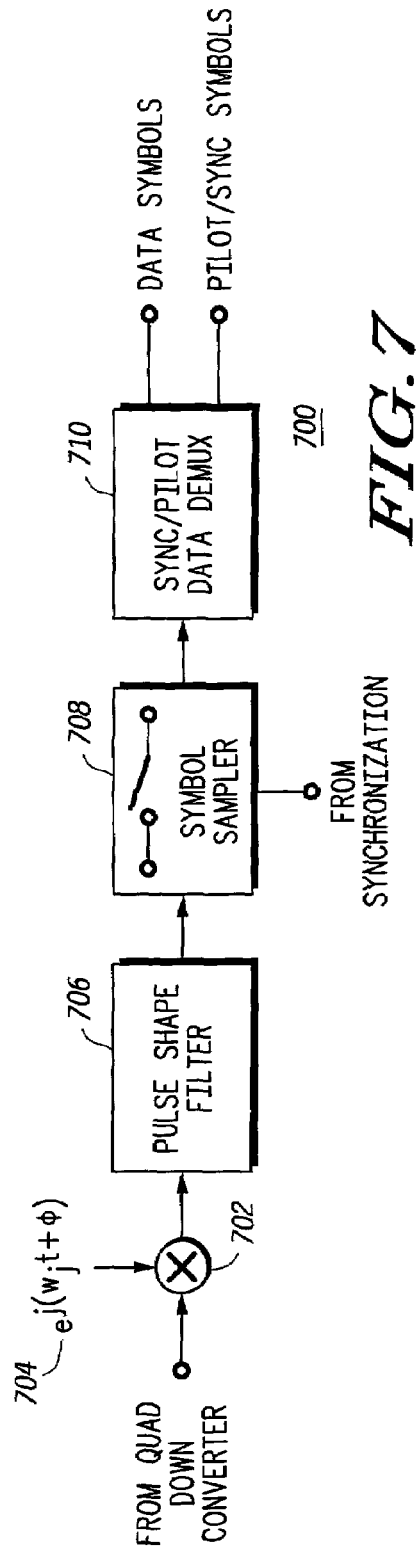
FIG. 7 shows a block diagram of one of the subchannel demodulation blocks of the multiple subchannel QAM receiver of FIG. 6 according to one embodiment of the present invention.

FIG. 7 shows one of the subchannel demodulation blocks in more detail. The composite signal received from the quadrature downconverter 604 (FIG. 6) is sent into a complex mixer 702 to translate the subchannel being demodulated from the sub-carrier frequency to 0 Hz. This is done by mixing the received downconverted signal by a sub-carrier signal 704. The signal from the mixer 702 is then sent into a pulse shape filter 706. The pulse shape filter 706 removes all the other subchannels except for the one centered at 0 Hz from the composite signal. The signal out of the pulse shape filter is then sent into a symbol sampler 708. The symbol sampler 708 samples the signal at the center of the pulse shape so that corrupted sync, pilot, or data symbols are obtained. The symbol sampler uses the input from the synchronization block 606 (FIG. 6) to determine when to do this sampling.

The corrupted sync, pilot, and data symbols from the symbol sampler 708 are sent to a sync/pilot data symbol demultiplexer 710. The sync/pilot data symbol demultiplexer splits the stream of corrupted symbols received from the symbol sampler 708 into two streams. The corrupted data symbols are sent to the symbol decision block 616 (FIG. 6) and the corrupted pilot and sync symbols are sent to the pilot interpolation block 618 (FIG. 6).

The pilot interpolation block 618 receives corrupted pilot and sync symbols from the sync/pilot data symbol demultiplexer 710 from all of the M subchannel demodulators 610, 612, 614. It produces estimates of the effects of the communication channel for each of the data symbols. These channel estimates are sent from the pilot interpolation block 618 to the symbol decision block 616 where they are used to determine what symbols the receiver sent. One particular pilot-based communication channel estimation method that could be used by the pilot interpolation block 618 is detailed in the U.S. patent application Ser. No. 07/783,289, titled "Communication Signal Having A Time Domain Pilot Component," assigned to the assignee of the current invention and incorporated herein by reference in its entirety.

Returning again to FIG. 6, the symbol decision block 616 uses the corrupted data symbols from the subchannel demodulators 610, 612, 614 along with the channel gain and phase estimates from the pilot interpolation block 618 to determine which QAM symbols were sent by the transmitter 300. One method for doing this is described in the '289 application. The symbol decision block 616 outputs QAM symbols to a parallel symbol to serial bit converter 620. The parallel symbol to serial bit converter maps the QAM symbols from the M subchannels to a serial stream of bits. The mapping used to obtain the stream of bits from the QAM symbols is the inverse of the mapping used by the symbol converter 306 (FIG. 3).

As with the transmitter 300 (FIG. 3), many if not all of the functions of the receiver 600 may be implemented in a DSP. Other embodiments of the receiver 600 are also possible. For example, if the transmitter 300 had used symbols other than QAM symbols, the receiver M-parallel complex symbols to serial bit block 620 would use the corresponding symbol mapping. If instead of using a mapping from bits to symbols the transmitter had used the well known method of convolutional encoding, the receiver would use an appropriate decoding method to return to a serial bit stream. One such method is described in the U.S. Pat. No. 5,134,635 titled "Convolutional Decode Using Soft-Decision Decoding With Channel State Information" assigned to the assignee of the present invention and incorporated herein by reference in its entirety.

In one embodiment, the wireless links 215 (FIG. 2) use frequency division duplexing (FDD). In FDD different frequencies are used for communication from the repeaters 207 to the communication units 210 (called the downlink) and from the communication units 210 to the repeaters 207 (called the uplink). Multiple communication units 210 share each of the wireless links 215 using time division multiple access (TDMA). As is well known in the art, in TDMA the wireless links 215 are divided into blocks of time called time slots. The time slots can be assigned to different communication units 210. On the downlink, the repeaters 207 transmit continuously in each of the TDMA time slots with the time slots destined for the different communication units 210. On the uplink the communication units 210 take turns transmitting in the different TDMA time slots. Although the communication units 210 share the wireless links 215, the TDMA time slots need not be equally distributed among the communication units 210 and in fact a single radio may be assigned multiple contiguous time slots.

In another embodiment of the present invention, the wireless links 215 use time division duplexing (TDD). In TDD, the same frequencies are used by the communication units 210 and the repeaters 207 for communication on the uplink and the downlink. The frequencies are divided into blocks of time for use in uplink communication and downlink communication. The blocks of time are further subdivided into time slots so that the wireless links can be shared by the multiple communication units 210 using TDMA in both the uplink and downlink. As with FDD, during the block of time used for uplink communication, the multiple communication units 210 will take turns transmitting in the different TDMA time slots. In the block of time reserved for downlink communications, the repeaters 207 transmit continuously with the different TDMA time slots destined for different communication units 210.

In one embodiment of the present invention, on the uplink there are four different types of time slots: reserved, unassigned, random access and acknowledgment slots. The apportionment of the uplink TDMA slots to the different types can be done by the repeater 207 during downlink slots or may follow a predefined pattern (i.e. for example every fifth slot could be random access). The reserved time slots are assigned by the repeater for the use of one of the communication units 210. During the unassigned time slots no communication units 210 are allowed to transmit. During a random access slot, any of the communication units 210 may transmit. However, if more than one of the communication units 210 transmits during the random access time slot, a collision may occur and the data in the slot may not be received by the repeater 207. The acknowledgement slots are used by the communication units 210 to notify the repeaters 207 if previously transmitted downlink slots were received without errors.

Figure 8:
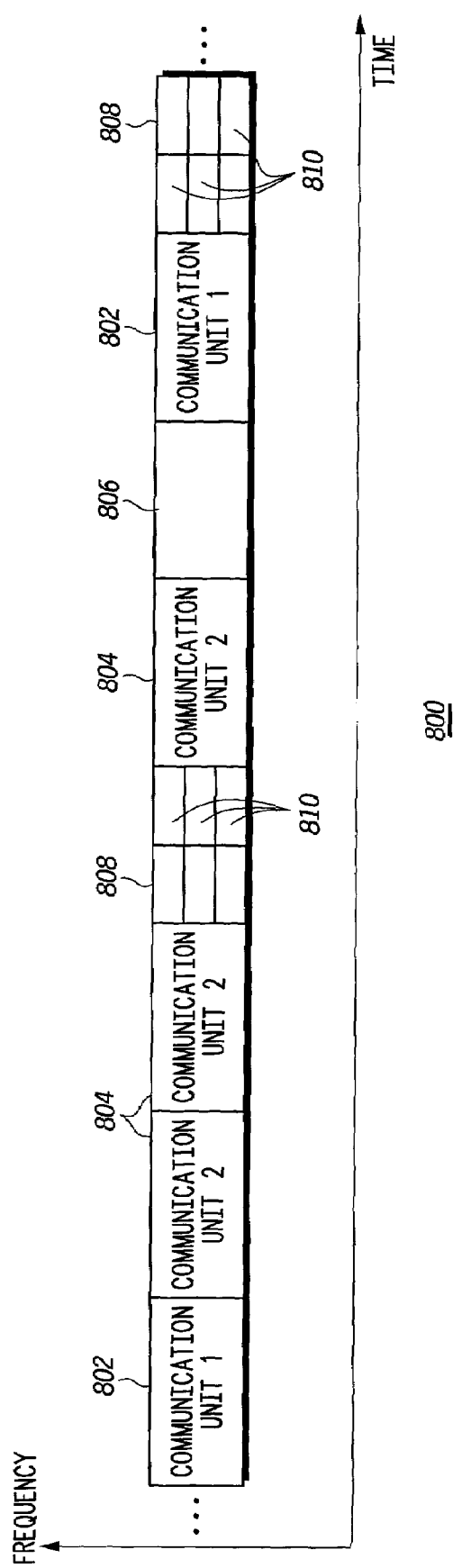
FIG. 8 is a diagram of an example of uplink time slots of a TDMA wireless link according to one embodiment of the present invention.

An important use of the random access time slots is for the communication units 210 to send an assignment request to the repeaters 207 to receive reserved uplink time slots. Another use of the random access time slots is for the communication units 210 to send small amounts of data to the repeaters 207 without the need for requesting a reserved uplink time slot. Typically, the amount of data sent in an assignment request is small compared to the amount of data that can be carried in a TDMA time slot. Because of this, the random access time slots may be divided into a number of subslots. When a communication unit 210 needs to send random access data, it transmits in only one of the subslots. FIG. 8 shows an example of the uplink time slots of a TDMA wireless link according to one embodiment of the present invention. The horizontal axis of FIG. 8 represents time and the vertical axis represents frequency. In FIG. 8, two time slots 802 are reserved for a first communication unit ("communication unit 1"), three time slots 804 are reserved for a second communication unit ("communication unit 2"), one time slot 806 is unassigned, and two time slots 808 are random access time slots. In the embodiment of FIG. 8, each of the random access time slots 808 is divided into six subslots 810. This division is done by splitting the random access time slot 808 twice in frequency and once in time. Hence each of the subslots 810 occupies one third of the bandwidth and one half of the time of a time slot. As will be appreciated, other division are possible and are within the scope of the present invention.

Dividing the random access time slots into subslots has several advantages. First, it allows more efficient use of the random access time slot. This is because most of the random access transmissions such as request for reserved time slots require only a small amount of data to be sent. If the time slot were not divided into subslots, most of the time slot would be wasted. Secondly, division of the time slot decreases the probability of collision between random access transmissions because there are more transmit opportunities. For example, assume that two communication units 210 are planning to transmit during a one second period and that there are four random access time slots during the one second period. If the time slot is not split into subslots, the probability of the transmissions colliding is 25% assuming that each communication unit 210 randomly chooses the time slot to transmit in. If each random access time slot is split into six subslots, the collision probability decreases to 4.2% again assuming that each communication unit 210 randomly chooses the subslot to transmit in. Hence, the random access transmissions are more likely to be received successfully when the time slot is divided into subslots.

Figure 9:
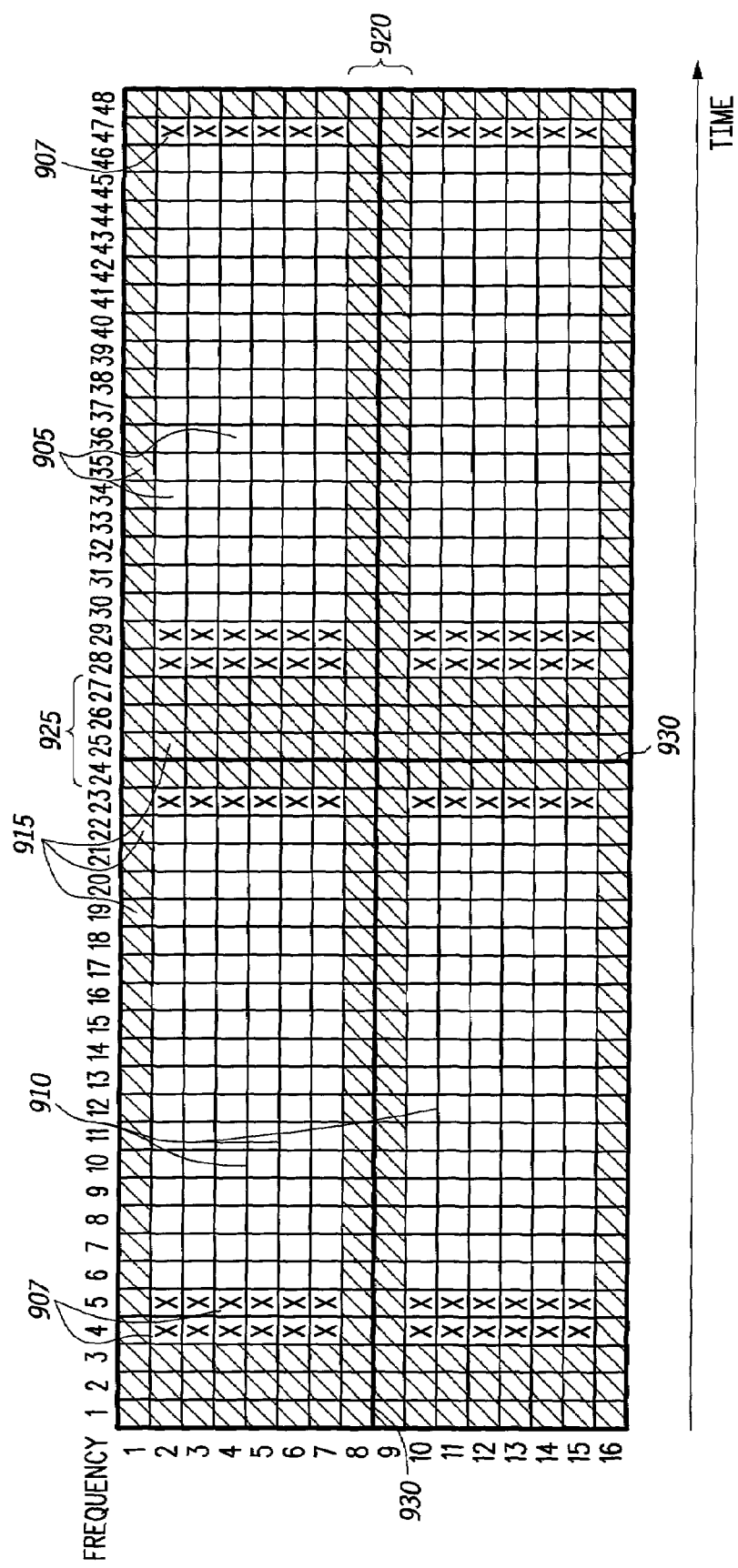
FIG. 9 is a diagram of a random access time slot that has been divided into four subslots according to one embodiment of the present invention.
Figure 10:
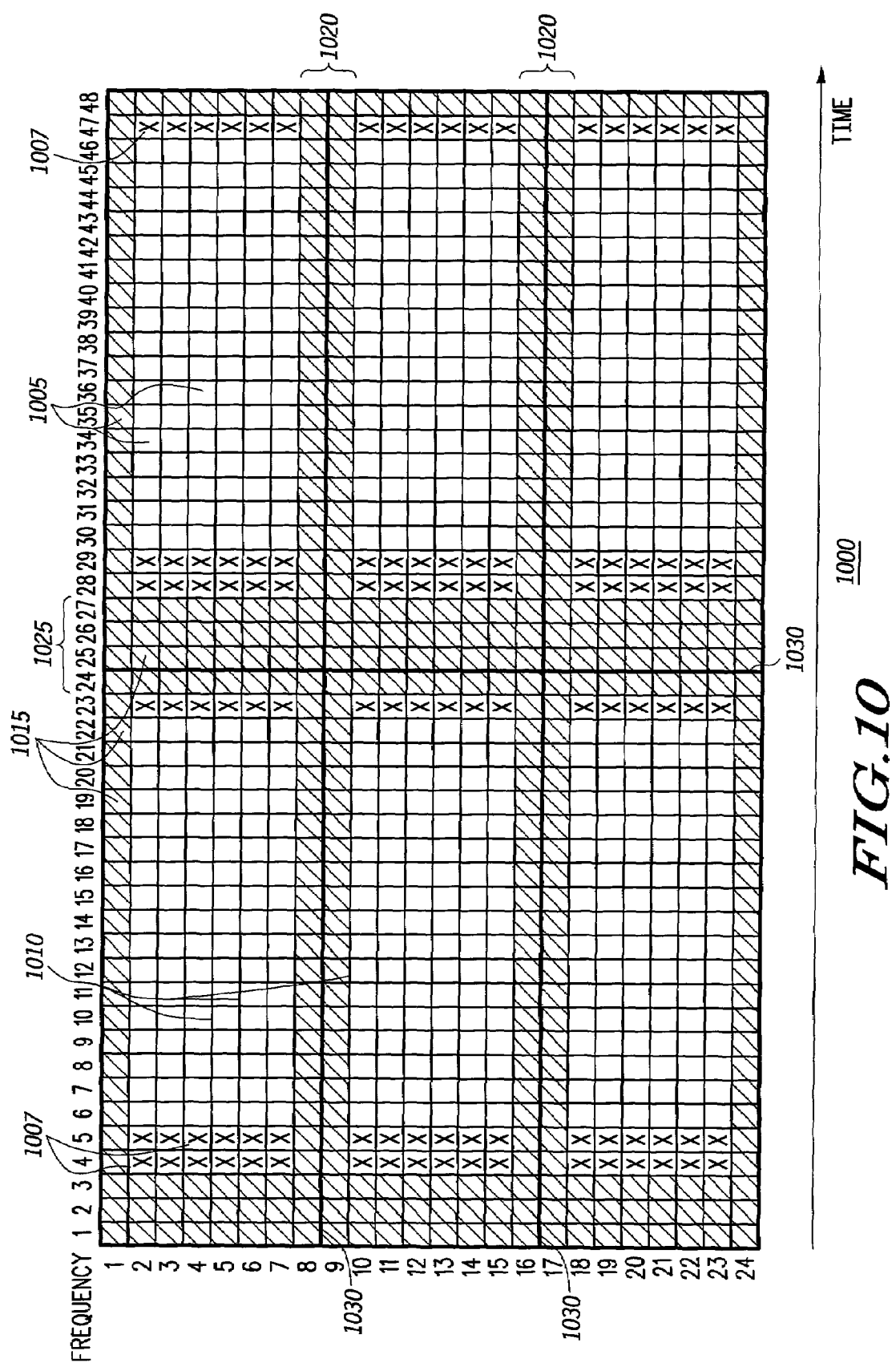
FIG. 10 is a diagram of a random access time slot that has been divided into six subslots according to one embodiment of the present invention.

FIG. 9–10 depict TDMA time slot structures 900, 1000 for a random access time slot that has been divided into subslots according to one embodiment of the present invention. The TDMA time slot structure of FIG. 9 with four subslots is suitable for a wireless link with a 100 kHz bandwidth when each of the sixteen subchannels occupies a bandwidth of 5.4 kHz. The TDMA time slot structure of FIG. 10 with six subslots is suitable for a wireless link with a 150 kHz bandwidth when each of the twenty-four subchannels occupies a bandwidth of 5.4 kHz. The sixteen or twenty-four subchannels of the two TDMA time slot structures are shown on the vertical axis of FIG. 9–10. The horizontal axis represents time. Each square 905, 1005 in FIG. 9–10 represents the location of synchronization, pilot, data or guard symbols in the respective pattern. The synchronization symbols 907, 1007 are shown by the squares containing an 'X'. The pilot and data symbols 910, 1010 are shown by the unshaded squares. The guard symbols 915, 1015 are shown by the shaded squares. The communication units 210 do not transmit during the guard symbols 915, 1015 so as to provide isolation in time and frequency between the different subslots. The guard symbols 915, 1015 comprise frequency guard bands 920, 1020 and time guard bands 925, 1025. The boundaries between the subslots are shown by the dark lines 930, 1030.

The random access TDMA time slot structures 900, 1000 of FIG. 9–10 each contain unused subchannels as frequency guard bands 920, 1020 between the subslots that are adjacent in frequency. These are necessary to prevent the transmissions from different communication units 210 from interfering with each other. As is well known in the art, the signal transmitted by each communication unit 210 has a small frequency offset from where it is supposed to be centered in frequency. If the unused subchannels were not present between subslots, the outer most subchannels in each subslot may overlap due to the frequency offsets and the data symbols carried in those subchannels may not be recoverable by the repeater 207. Of course in other embodiments of the present invention these guard bands 920, 1020 may not be present if the frequency offsets of the communication units 210 can be made small enough to avoid significant overlap between subslots adjacent in frequency or if the individual subchannels have enough space between them to provide the necessary guard band.

The random access TDMA time slot structures of FIG. 9–10 also contain unused symbol locations as time guard bands 925, 1025 between the subslots that are adjacent in time. These are necessary to prevent the overlap of time adjacent subslots. This overlap occurs because of the different propagation delays between the different communication units 210 and the repeater 207 and the power up and power down times of the power amplifiers in the communication units 210. Of course in other embodiments the length of this guard time between subslots can be shortened or eliminated if the communication units 210 have some idea of the propagation times and are able to adjust their transmit times accordingly and if the power up and power down times of the communication units 210 are not significant.

Figure 1:
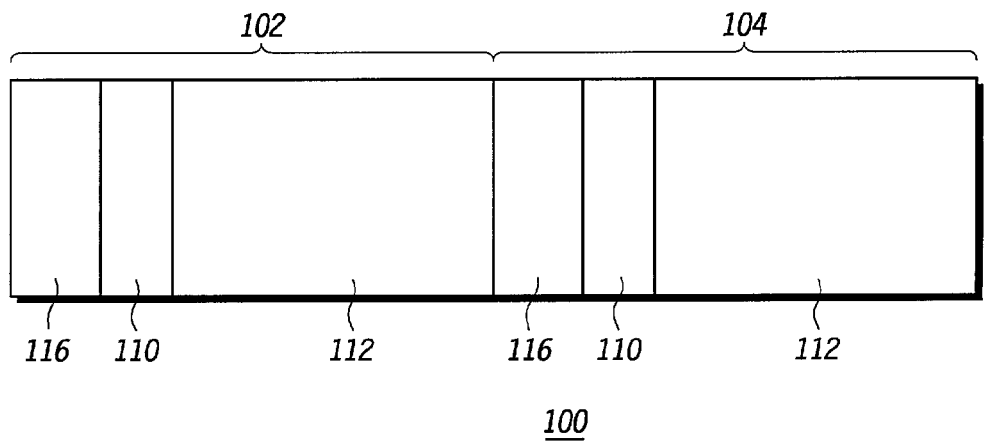
FIG. 1 is a diagram of a TDMA random access time slot that has been divided into two subslots.
Figure 11:
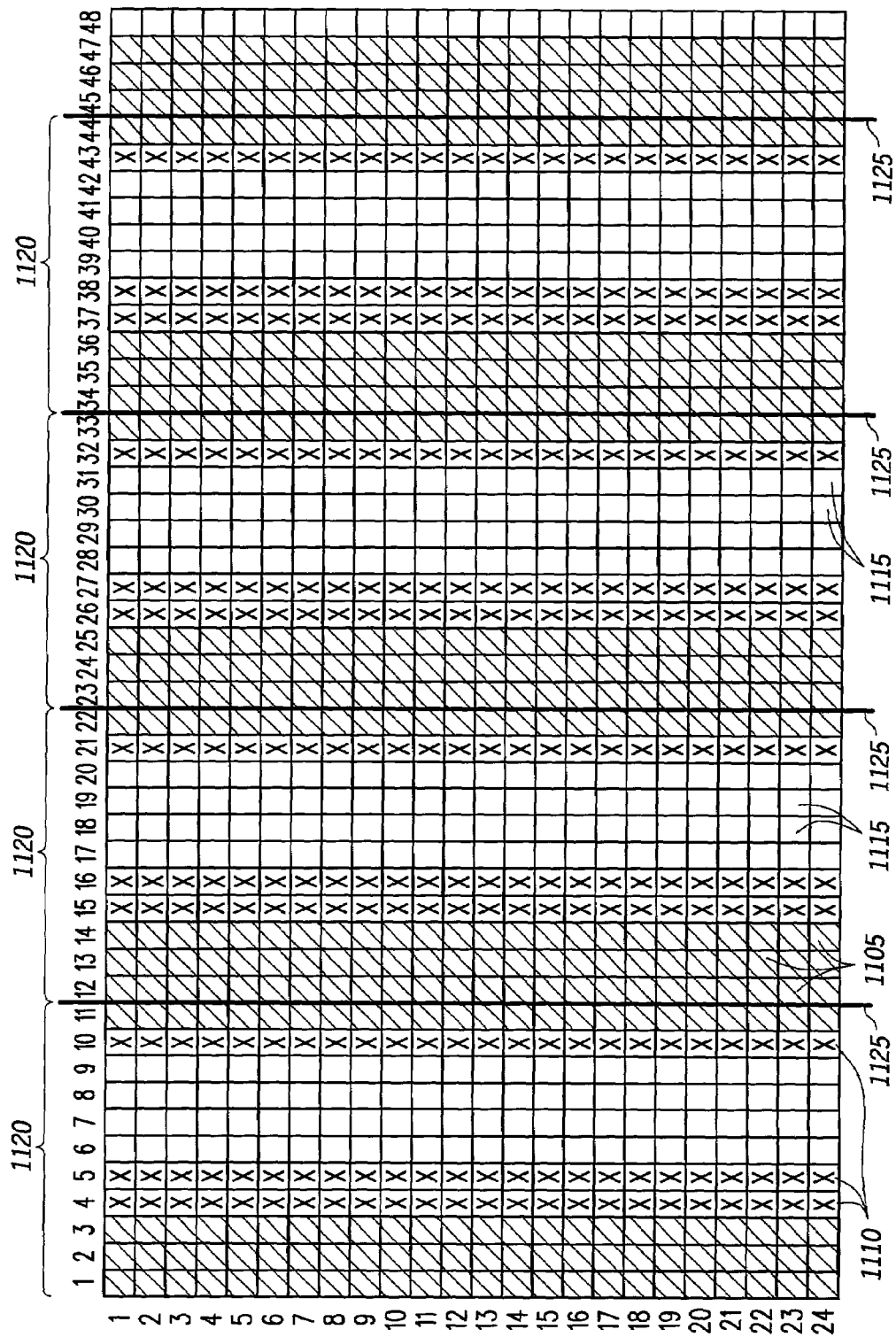
FIG. 11 is a diagram of a random access time slot that has been divided in time into four subslots.

As mentioned above with regard to FIG. 1, the length of time devoted to guard bands and synchronization symbols does not change regardless of how the bandwidth of the signals used in the wireless links 215 is changed. As a result, for wider bandwidth signals dividing the random access time slots into subslots in frequency (or in both frequency and time) results in more efficient use of the time slots than just dividing the time slots in time. An example of this efficiency is illustrated by the random access time slot structure 1100 shown in FIG. 11. The time slot structure 1100 of FIG. 11 is divided into subslots in time instead of in both time and frequency as the time slot structure 1000 of FIG. 10. In FIG. 11, the locations of guard symbols 1105 are shown by the shaded squares, synchronization symbols 1110 are shown by the squares containing an 'X', and pilot and data symbols 1115 by the unshaded squares. The boundaries between subslots 1120 are shown by the dark lines 1125. The time slot structure 1100 of FIG. 11 is the same length and has the same number of subchannels as the time slot structure 1000 of FIG. 10. Like the subslots of the time slot structure of FIG. 10, each of the subchannels in the subslots 1120 of FIG. 11 contains four guard symbols and three synchronization symbols. However, the time slot structure 1100 of FIG. 11 is able to hold only four subslots instead of six subslots as in the time slot structure 1000 of FIG. 10. This is despite the fact that each of the subslots of FIG. 11 actually contains six fewer data and pilot symbols than the subslots of FIG. 10. As will be appreciated, the efficiency of dividing random access time slots in both frequency and time as opposed to just dividing in time is even more pronounced in even wider bandwidth signals and in fact for much wider signals just dividing the subslots in frequency instead of in both time and frequency will be more efficient.

Figure 12:
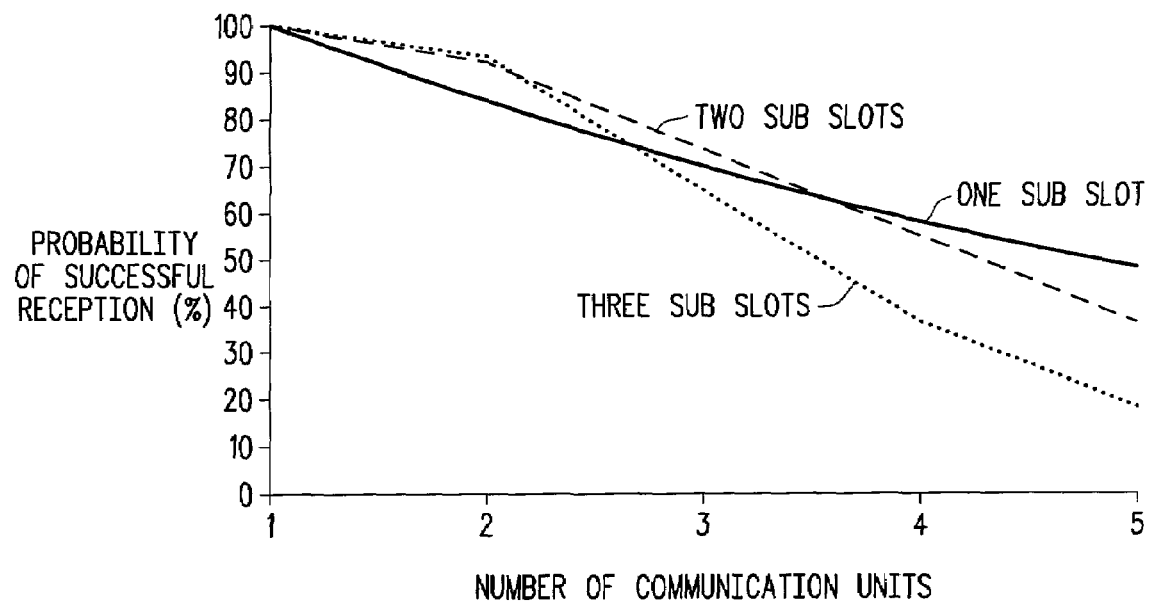
FIG. 12 is a graph showing the probability of successfully receiving a transmission in a random access time slot that has been divided into six subslots when the transmissions are made in multiple subslots.

In an alternate embodiment of the present invention, the communication units 210 may transmit identical transmissions in multiple subslots to increase the likelihood that one of the transmissions will be successfully received by the repeater 207. For example, the benefit of the communication units 210 making multiple transmissions in a random access slot that is divided into 6 subslots is illustrated by the graph of FIG. 12. In FIG. 12, the horizontal axis represents the number of communication units 210 attempting to transmit in the random axis slot and the vertical axis represents the probability of at least one of each of the communication unit's transmissions being successfully received by the repeater. The solid line shows the probability of successful reception when each communication unit 210 only transmits in one of the subslots. The dashed line shows the probability of successful reception when each communication unit 210 transmits in two of the six subslots. The dotted line shows the probability of successful reception when each communication unit 210 transmits in three of the six subslots. As seen from FIG. 12, if there are only two communication units attempting to transmit in the random access slot, transmitting in multiple subslots results in a higher probability of successful reception. For example, if two communication units are attempting to transmit during the random access slot, the probability of successful reception is 82% if each one transmits in one subslot, 93% if each one transmits in two subslots and 95% if each transmits in three subslots.

It will be appreciated from FIG. 12 that if more than two communication units 210 transmit in a random access slot containing six subslots, the probability of successful reception actually decreases when the communication units 210 transmit in more than one subslot. However, in many communication systems 200 where random access slots are used predominantly for requesting reserved slots, it is not likely that more than two communication units 210 will attempt to transmit in the same random access slots. Of course if the random access slot contains more than six subslots, the probability of successful reception may increase with multiple subslot transmissions even in the presence of more than two communication units 210 attempting to use the random access slot. For example, if the random access slots contain twelve subslots and three communication units attempt to transmit, the probability of successful reception increases from 83.9% to 92.6% when the number of subslots each communication unit 210 transmits in increases to two from one.

In some communication systems 200 it may be desirable to enable certain communication units 210 to have higher priority than others when requesting reserved slots and sending random access data. For example, a communication system may have a combination of public safety (police and other emergency agencies) and non-public safety users. In such a situation the public safety users could be given priority over other users. Accordingly, in one embodiment of the present invention, the number of subslots in which the communication units 210 transmit in a random access slot depends on the priority of the communication units. Communication units 210 with higher priority transmit in a greater number of subslots than communication units 210 with a lower priority. Hence the higher priority communication units 210 have a greater likelihood of having their random access transmissions successfully received. Alternately, some of the subslots in a random access time slot can be reserved for use exclusively by higher priority communication units 210 to increase the probability of successful reception of the transmissions from the higher priority communication units 210.

Figure 13:
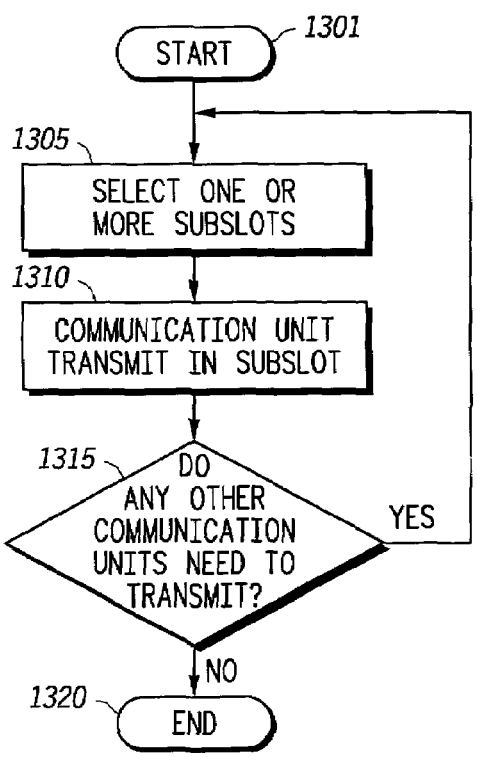
FIG. 13 is a flow chart of a method by which at least one communication unit communicates information in a selected one or more subslots of a time slot according to one embodiment of the present invention.

There is shown in FIG. 13 a flow chart of a method by which at least one communication unit 210 communicates information in a selected one or more subslots of a time slot according to one embodiment of the present invention. This method is for use in a communication system 200 adapted for communicating information in one or more time slots within a predetermined bandwidth. At least one of the time slots includes at least two subslots that are non-overlapping in frequency. These at least two non-overlapping in frequency subslots may be adjacent in frequency or may be separated from each other in frequency. In addition, the time slot may contain one or more time slots that do overlap other subslots in frequency. The method begins at step 1301 and flow passes to step 1305 where one or more subslots are selected. This selection may be made by a communication unit 210 or by some other entity such as a repeater 207 or other device in the communication system infrastructure. This selection of one or more subslots may be done randomly, using some algorithm designed to avoid collisions with other communication unit's transmissions or using some other method. After selection of the one or more subslots, the communication unit 210 transmits information in the selected one or more subslots at step 1310. These transmissions may be done by sending identical information in the one or more selected subslots to increase the probability of the information reaching a receiver without collision. Alternatively, different information may be sent in the one or more selected subslots. At step 1315, if there are additional communication units that need to transmit, steps 1305 and 1310 are repeated. If there are no additional communication units that need to transmit, the method ends at step 1320.

It will be appreciated by those skilled in the art that in other embodiments of the present invention, the division of time slots into subslots may be done in time slots other than random access slots. This division may be done with other types of time slots to allow portions of the time slots to be assigned to different communication units 210. One example of a situation where this would be desirable is when the data being transported by the communication unit 210 is a voice conversation. As is well known, voice that has been digitized (converted to a stream of bits) results in a data rate that is low compared to most other data applications such as internet use or computer file transfers. If the size of the time slots is optimized for data applications other than voice, the time slots will be larger than what is required to transport voice. Hence in this situation it would be desirable to be able to assign portions of a time slot to different communication units 210 transporting digitized voice.

It will be further appreciated that other embodiments of the present invention are possible. For example, the time slots may be divided into subslots by dividing the time slots in frequency any number of times. The time slots may be divided in time any number of times or not divided in time at all. The division of the time slots may be done in wireless links having any bandwidth. The communication system may have different types of time slots other than reserved, random access and unassigned. All subslots in a time slot need not have the same bandwidth and length. The present invention may be practiced in communication systems employing modulations with any number of subchannels including single subchannel modulations such as BPSK, FSK, GMSK, etc. The present invention may also be employed in communication systems that do not have repeaters such as Aloha and Slotted Aloha systems. As is well known, in Aloha and Slotted Aloha systems, a number of communication units share a wireless link exclusively using random access (i.e. there are no reserved slots). The present invention may also be employed in other types of communication systems than the communication system 200 of FIG. 2 such as, for example, cable systems, wireline phone systems, satellite systems, packet radio systems and fiber optic systems. In these types of communication systems additional types of communication units such as computer modems, cable modems, satellite transmitters, satellite receivers, satellite ground stations, fiber optic repeaters, etc. can be used as transmitters and/or receivers. As will be appreciated many other embodiments are possible without departing from the scope and spirit of the present invention. However, in all embodiments the subslots shall be formed by dividing a time slot at least once in frequency.

The present invention thereby provides a more efficient method of utilizing a time slot when small amounts of data are being transmitted. The invention reduces the required overhead by dividing the time slot at least in frequency into a plurality of subslots. The invention also provides a method of increasing the probability of successful reception of random access transmissions in the plurality of subslots by transmitting multiple copies of the transmissions in the plurality of subslots.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. In a communication system adapted for communicating information in one or more time slots within a predetermined bandwidth, a method comprising:
    communicating information, by at least one communication unit, in selected one or more random access subslots,
    wherein the one or more time slots is divided into multiple subchannels,
    wherein each subchannel of the multiple subchannels is non-overlapping in frequency, and
    wherein each subchannel of the multiple subchannels is divided into the one or more random access subslots that is non-overlapping in time.

2. The method of claim 1 comprising:
    transmitting information in a first one of the random access subslots by a first communication unit; and
    transmitting information in a second one of the random access subslots by a second communication unit.

3. The method of claim 1 comprising transmitting, by the at least one communication unit, information in a plurality of the random access subslots.

4. The method of claim 3 wherein the communication unit communicates identical information in each of the plurality of the random access subslots thereby increasing the probability of the information reaching a receiver.

5. The method of claim 1, wherein at least two of the random access subslots include two random access subslots that are adjacent in frequency.

6. The method of claim 1, wherein the predetermined bandwidth is 100 kHz, at least two of the random access subslots comprising a first and second random access subslot each having a 50 kHz bandwidth.

7. The method of claim 1, wherein at least two of the random access subslots include three random access subslots that are adjacent in frequency.

8. The method of claim 1, wherein the predetermined bandwidth is 150 kHz, at least two of the random access subslots comprising a first, second and third random access subslot each having a 50 kHz bandwidth.

9. The method of claim 1 comprising, prior to the step of communicating information in a selected one or more of the random access subslots:
    randomly choosing, by the at least one communication unit, one or more of the random access subslots, thereby defining the selected one or more of the random access subslots.

10. The method of claim 1 wherein the step of communicating information comprises:
    transmitting information in a first number of random access subslots by a first communication unit having a first priority; and
    transmitting information in a second number of random access subslots by a second communication unit having a second priority.

11. The method of claim 10 wherein the first number is greater than the second number if the first priority is higher than the second priority.

12. An apparatus for sending information over a communication channel that has been divided into time slots, the apparatus comprising:
    a transmitter operable to transmit information in a selected one or more of a plurality of random access subslots into which at least one of the time slots has been divided into multiple subchannels, wherein each subchannel of the multiple subchannels is non-overlapping in frequency and wherein each subchannel of the multiple subchannels is divided such that the random access subslots are non-overlapping in frequency.

13. The apparatus of claim 12 further comprising:
    a symbol insertion element operable to format the information to fit into the selected one or more of the plurality of random access subslots, yielding formatted information which is then forwarded to the transmitter.

14. The apparatus of claim 12 wherein the transmitter randomly selects the one or more of the plurality of random access subslots to transmit in.

15. The apparatus of claim 12 wherein the transmitter uses a multiple subchannel signal to transmit the information in the one or more selected random access subslots.

16. The apparatus of claim 12 wherein the transmitter sends identical information in a plurality of random access subslots to increase the probability that the information will be received by a receiver.

17. The apparatus of claim 12 wherein the transmitter is selected from the group consisting of wireless radio units, cellular radio/telephones, wireless modems, computer modems, cable modems, satellite transmitters, satellite ground stations and fiber optic repeaters.

18. An apparatus for obtaining information sent over a communication channel that is divided into time slots, the apparatus comprising:
    a receiver operable to receive information in one or more random access subslots
    wherein the time slots are divided into multiple subchannels,
    wherein each subchannel of the multiple subchannels is non-overlapping in frequency, and
    wherein each subchannel of the multiple subchannels is divided into the random access subslots that is non-overlapping in time.

19. The apparatus of claim 18 further comprising a demultiplexer that deformats synchronization, pilot and data symbols from the information received in the one or more of the plurality of random access subslots.

20. The apparatus of claim 18 wherein the receiver is adapted to demodulate a multiple subchannel signal.

* * * * *

UNITED STATES PATENT AND TRADEMARK OFFICE
CERTIFICATE OF CORRECTION

PATENT NO. : 7,088,734 B2 Page 1 of 1
APPLICATION NO. : 09/818814
DATED : August 8, 2006
INVENTOR(S) : Newberg et al.

It is certified that error appears in the above-identified patent and that said Letters Patent is hereby corrected as shown below:

On title page
Item [57]

In Abstract, line 2, after the word "slots" add --within--

In Abstract, line 6, change "times" to --time--

Signed and Sealed this

Twentieth Day of March, 2007

JON W. DUDAS
*Director of the United States Patent and Trademark Office*